United States Patent [19]

Stanley et al.

[11] 4,242,488

[45] Dec. 30, 1980

[54] MODIFIED POLYURETHANE ADHESIVE COMPOSITIONS CONTAINING A CARBAMATE ESTER ADDITIVE USEFUL IN LAMINATING SUBSTRATES

[75] Inventors: Henry Stanley, Cedar Grove; Dilip K. Ray-Chaudhuri, Bridgewater, both of N.J.

[73] Assignee: National Starch and Chemical Corporation, Bridgewater, N.J.

[21] Appl. No.: 37,476

[22] Filed: May 9, 1979

[51] Int. Cl.$^3$ .......................................... C08L 75/04
[52] U.S. Cl. ................................ 428/423.1; 156/331; 528/45; 528/59; 528/44
[58] Field of Search .................... 528/44, 45, 59; 260/32.6 NR; 525/457, 458, 459; 156/331; 428/425

[56] References Cited

U.S. PATENT DOCUMENTS

| | | | |
|---|---|---|---|
| 3,555,115 | 1/1971 | Bottomley et al. | 525/458 |
| 3,595,814 | 7/1971 | Lloyd et al. | 521/51 |
| 3,681,137 | 3/1971 | Nagazono | 525/458 |
| 3,887,755 | 6/1975 | Zamer | 525/457 |
| 3,931,077 | 1/1976 | Uchigaki et al. | 260/24 |
| 3,939,222 | 2/1976 | Dieterich | 525/458 |
| 3,991,025 | 11/1976 | Kutch et al. | 260/24 |
| 4,049,601 | 9/1977 | Anderson | 260/32.6 NR |

FOREIGN PATENT DOCUMENTS

2246108 3/1974 Fed. Rep. of Germany.
2404740 8/1975 Fed. Rep. of Germany.

OTHER PUBLICATIONS

Chem. Abstr. 81, 121719x, 1974.
Chem. Abstr. 83, 207703r, 1976.

*Primary Examiner*—Maurice J. Welsh
*Attorney, Agent, or Firm*—Edwin M. Szala; Janet E. Hasak

[57] ABSTRACT

A modified polyurethane adhesive composition characterized by its improved viscosity and high initial bond strength contains an isocyanate-terminated prepolymer or a fully reacted polyurethane and a carbamate ester which is compatible and not reactive with the prepolymer or polyurethane. The resultant adhesive is suitable for laminating many types of substrates. In a preferred embodiment the prepolymer is employed with the carbamate ester in a reactive hot-melt adhesive for use in bonding flexible substrates.

10 Claims, No Drawings

MODIFIED POLYURETHANE ADHESIVE COMPOSITIONS CONTAINING A CARBAMATE ESTER ADDITIVE USEFUL IN LAMINATING SUBSTRATES

BACKGROUND OF THE INVENTION

I. Field of the Invention

This invention relates to modified polyurethane adhesive compositions having improved viscosity and bond strength characteristics. This invention also relates to a process for laminating substrates using the polyurethane compositions herein.

II. Description of the Prior Art

Polyurethane adhesives, because of their excellent adhesive properties, are particularly desirable for use in bonding substrates. The most widely used adhesives for preparing flexible packaging laminations are based on curable polyether and polyester urethanes of low molecular weight, which are supplied as flammable solvent-borne systems of two types: one-part and two-part, both of which cure by reaction of isocyanate (NCO) groups. Other solvent-borne adhesives are fully reacted polyurethanes of high molecular weight. Water-based urethane adhesives are also known in the art.

As an alternative to these adhesives, the 100%-reactive, solvent-free adhesive system may be used, which is of two distinct types: (a) the reactive liquid adhesive, which is applied at room temperature and cured by radiation or through chemical combination, and (b) the reactive hot-melt adhesive, a solid at room temperature which, when heated to moderate temperatures (82°–121° C.), melts to a highly viscous liquid and cures upon contact with ambient moisture.

The reactive liquid urethane adhesives of type (a) may be composed of one or two parts. Unsatisfactory initial bond strength and short pot life after mixing are two disadvantages of the two-part adhesive. The reactive one-part adhesive is the most convenient of the reactive liquid adhesives, yet because of the high viscosity of such adhesives, a solvent is normally added thereto prior to application. In addition, residual monomers which remain after curing radiation-curable reactive liquid adhesives may produce odors or undesirable extractables.

There are several hot-melt urethane adhesives of type (b) known in the art. These urethane-based systems are superior to conventional hot-melt adhesives, which latter adhesives depend on their high molecular weight for their cohesive properties and hence have high viscosities of from 5000 to 10,000 cps. at temperatures of 150°–190° C. Furthermore, the conventional hot-melt compositions generally contain a variety of ingredients and are plagued by stability problems because of the high temperatures involved in their use. Finally, because these compositions are not curing, they are thermoplastic and lack resistance to solvents and heat.

The typical hot-melt urethane adhesives of the prior art contain a polyurethane prepolymer of low viscosity (such as is exemplified in Belgian Pat. No. 835,022), to which are added tackifiers, copolymers, thermoplastic polymers, adhesion promoters, etc., in varying mixtures, to enhance the initial bond strength and overall performance of the prepolymer (see, in particular, U.S. Pat. Nos. 3,931,077 and 3,991,025). Usually a combination of such additives is necessary to achieve sufficient bond strength in adhesives of this type, resulting in complicated formulations.

It is an object of the present invention to provide a polyurethane adhesive of simple and convenient composition having improved viscosity characteristics as compared with adhesives of the prior art.

It is another object to provide a modified adhesive composition having good bond strength, and, in one embodiment, offering good resistance to heat.

It is a further object to provide a process for laminating substrates and to provide a laminated film assembly wherein the modified urethane composition described herein is employed as the adhesive.

SUMMARY OF THE INVENTION

The above and related objects are achieved in an improved modified polyurethane adhesive composition comprising an isocyanate-terminated prepolymer or a fully reacted polyurethane and at least an effective amount of a carbamate ester which contains at least one linkage of the formula:

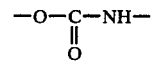

and which is compatable and not reactive with said prepolymer or fully reacted polyurethane.

The improvement represented by the present invention lies in adding to the polyurethane or prepolymer a carbamate ester containing one or more linkages described above, which ester must not contain isocyanate, hydroxyl or other functional groups which are reactive with isocyanate compounds and/or compounds containing active hydrogen atoms. Furthermore, such esters must be compatible with the polyurethane or prepolymer and must be stable under moderate conditions of heat. While it is possible to employ the carbamate ester as an oligomer of low molecular weight, use of the monomeric ester is preferred.

It is believed that the carbamate ester improves the adhesive composition in the heated (molten) state by acting as a solvent or plasticizer and improves the composition at room temperature as a viscosity builder and a strengthening agent. The most effective carbamate ester employed herein are high-melting, insoluble crystalline solids, and the decrease in viscosity upon addition of the ester to the molten polyurethane composition occurs unexpectedly at temperatures below the actual melting point of the carbamate ester.

DESCRIPTION OF THE PREFERRED EMBODIMENTS

Although it is preferred to add the carbamate esters to prepolymers to prepare solventless compositions for bonding flexible substrates as described above, the carbamate esters may also be added to prepolymers and fully reacted polyurethanes to prepare solvent-borne adhesive compositions for use in bonding non-flexible as well as flexible substrates. Typical organic inert solvents for these adhesives are, for example, ethyl acetate, methyl ethyl ketone, tetrahydrofuran, methylene chloride, acetone, methyl isobutyl ketone, and toluene.

The isocyanate-terminated polyurethane prepolymers applicable herein are well known in the art and may include blocked isocyanate prepolymers. For example, a polyalkylene glycol or polyalkylene ether, polyester, polyacetal, polyamide, polyester polyamide or polythioether polyol may be reacted with a diisocyanate such as those mentioned below to form a suitable prepolymer with residual isocyanate groups. Any of the usual additives may be present in the prepolymer such as chain extenders, urethane catalysts, etc. Representative of the diisocyanates usable herein are, for example, the aliphatic compounds such as trimethylene, pentamethylene, hexamethylene, 1,2-propylene, 1,2-butylene, 2,3-butylene, ethylidiene, and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as methylene bis-phenyl, 2,4- or 2,6-tolylene (or mixtures thereof), 4,4'-toluidine, and 1,4-xylene diisocyanates; the nuclear-substituted aromatic compounds such as dianisidine, 4,4'-diphenylether and chlorodiphenylene diisocyanates; etc.

The fully reacted polyurethanes suitable as the adhesive base are polyurethanes having no excess of free isocyanate groups and substantially no excess of free hydroxyl groups, and may be chosen from a wide variety of urethane polymers, and are prepared generally by reacting an organic polyisocyanate with a polyhydric compound, preferably in the presence of a suitable urethane catalyst, by conventional procedures well known in the art. The polyurethanes may also be obtained commercially. Typical polyisocyanates for use in preparing the polyurethanes are the diisocyanates mentioned above; the triisocyanates such as triphenyl methane-4,4',4"-triisocyanate, 1,3,5-triisocyanate benzene and 2,4,6-triisocyanate toluene; the tetraisocyanates such as 4,4'-diphenyl-dimethylmethane-2,2',5,5'-tetraisocyanate; the polymerized polyisocyanates such as tolylene diisocyanate dimers and trimers; and the like.

Suitable polyhydric compounds herein are, for example, simple polyols such as ethylene glycol, propylene glycol, and glycerol, as well as other polyols such as trimethylolpropane, hexanetriol, pentaerythritol, and the like, and mono- and polyethers such as diethylene glycol, polypropylene glycol, and alkylene oxide condensates thereof. Among the alkylene oxides that may be condensed with these polyols to form polyethers are ethylene oxide, propylene oxide, butylene oxide, styrene oxide, and the like. These are generally called hydroxy-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol, and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures, glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like, with alkylene oxides such as ethylene oxide, propylene oxide, their mixtures, and the like. Polyester polyols, prepared by reacting diacids with polyols, are also suitable herein, as, for example, neopentyl glycol-1,6-hexanediol adipate.

As mentioned above, the carbamate esters used to modify the prepolymer or fully reacted polyurethane in accordance with the present invention must contain one or more linkages of the formula

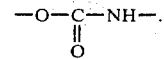

As a representative example, the carbamate esters useful herein may fall within the general formula:

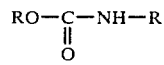

wherein the R groups are independently a substituted or unsubstituted alkyl, alkenyl, cycloalkyl, aryl, alkaryl or aralkyl radical, or a substituted or unsubstituted alkylene, alkenylene, cycloalkylene or arylene radical containing one or more of the linkages

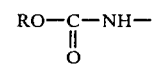

(where R is defined as above). It is noted that the carbamate ester herein may have other linkages in addition to the carbamate linkage(s) such as, for example, a urea linkage, if such linkages do not interfere with the basic function of the carbamate ester.

Preparation of the carbamate esters, if they are not obtained commercially, may be carried out by any one of several synthetic routes. The most common procedure involves reacting an organic isocyanate with a hydroxy-containing compound in accordance with known processes. One such process is described in J. Chambers and C. Reese, *The British Polymer Journal*, March, 1977, pp. 41–42, wherein the freshly purified isocyanate component is charged into a reaction vessel with solvent are purged with nitrogen gas, and the hydroxy compound is added slowly thereto with stirring. The reaction mixture is thereafter heated to reflux until no isocyanate remains, as determined by infrared spectroscopy. Alternatively, the hydroxy compound may be added all at once to the isocyanate, or the isocyanate may be added to the hydroxy compound. For purposes herein, no purification or recrystallization of the product is ordinarily needed due to the comparatively high yield of product obtained by this reaction, and the carbamate ester so prepared is isolated and used directly in the preparation of the adhesive.

Suitable monoisocyanates in the above-described procedure for preparing the carbamate esters include, for example, phenyl isocyanate and tolyl isocyanate, while representative polyisocyanates are mentioned above. Mixtures of isocyanates may also be used. The preferred isocyanates herein are methylene bis-phenyl diisocyanate, phenyl isocyanate, isophorone diisocyanate and toluene diisocyanate such as HYLENE TM (trademark of E. I. duPont de Nemours, Inc.).

The mono- or polyhydroxy compounds suitable for preparing the carbamate esters must contain at least one hydroxyl group attached to an aliphatic carbon atom. Hydroxyl groups attached to aromatic carbon atoms, such as those in phenols, for example, are good blocking groups which are removed at moderate temperatures and are thus not suitable in forming stable carbamate esters for use herein. Any aliphatic (e.g., alkyl, alkenyl, alkoxy), cycloaliphatic (e.g., cycloalkyl, cycloalkenyl, cycloalkoxy), and aromatic-aliphatic (e.g., aralkyl, alkaryl, aralkenyl mono- or polyhydroxy compounds are applicable herein, provided that they form a carbamate ester as defined above. Representative of these compounds are methyl, ethyl, chloroethyl, n-propyl, n-butyl, iso-butyl, amyl, 2-methylbutyl, hexyl, 2-methylpentyl, 2-ethylhexyl, n-octyl, nonyl, 3,3,5-trimethylhexyl, decyl, and lauryl alcohols, phenylcarbinol, methylphenylcarbinol, methoxydiethylene glycol, butoxydiethylene glycol, 2-methoxyethanol, 2-butoxyethanol, cyclohexanol, cyclohexenol, ethylene glycol, glycerine, pentaerythritol, and the like, as well as mixtures thereof. The preferred hydroxy-containing compounds herein are the $C_2$–$C_{15}$ alcohols, alkylene glycols, glycerine, pentaerythritol, 2-methoxyethanol, and methoxydiethylene glycol.

It will be recognized by the practitioner that the correct choice of hydroxy compound depends on the isocyanate employed. For example, some of the combinations mentioned above would not be compatible due to steric considerations, etc. In addition, it is noted that a polyisocyanate is always reacted with one or more monohydroxy compounds, while a polyhydroxy compound is normally reacted with a monoisocyanate. Examples of these combinations are phenyl isocyanate with glycerine, and methylene bis-phenyl diisocyanate with n-butanol.

Other procedures for preparing carbamate esters besides reaction of isocyanate with an alcohol include, for example, reaction of a carbamoyl chloride (i.e., a chloroformate) with an amine; thermal decomposition of nitrile carbonates or aminimides; and thermal dissociation of typical isocyanates which are blocked by a group such as phenol, alkyl oxime, lactam, etc. The present invention is not limited to any particular method of preparing carbamate esters, however, and any such compound with at least one carbamate ester linkage as described above is applicable herein.

The amount of carbamate ester added to the polyurethane or prepolymer is highly dependent on the particular carbamate and polyurethane employed, and must always be sufficient to reduce the viscosity at elevated temperatures and enhance the bond strength of the adhesive to acceptable levels. A carbamate ester which is structurally very similar to the polyurethane or prepolymer and which therefore tends to be more highly compatible can be used in higher amounts than one which is not so compatible therewith. The amount of carbamate ester ordinarily employed will broadly range from 2.0 to 110% by weight, based on the polyurethane or prepolymer, with preferred amounts varying additionally with the particular properties desired in the final product. For example, good heat resistance in the adhesive may be obtained by adding the ester in amounts which are smaller than the maximum tolerated for a particular ester and polyurethane, e.g., 2–50% by weight.

It is noted that the carbamate ester may not only be post-added to the urethane polymer, but also may be added before or during polymerization of the monomers in forming the polymer.

As mentioned above, the reactive hot-melt adhesive composition containing the prepolymer is the preferred adhesive of this invention. This adhesive is applied in molten form to the substrate using any of the usual procedures. Any suitable coating apparatus can be used such as conventional hot-melt coaters including roller coater (gravure roller, reverse roller), curtain coaters, nozzles, sprays, doctor blades, etc., equipped with heated melting vessels or pots. A particularly effective coating apparatus is the Swiss Polylaminator Machine. The melting vessel (adhesive pan) may be purged with nitrogen gas to insure a longer pot life; however, the molten adhesive is observed to have good stability even when such measures are not taken.

Coating of the substrate can be made nearly continuous by adding the adhesive composition to the adhesive pan as the adhesive is consumed by the coater. For the best bond strengths in flexible packaging laminations, the coating weight of the adhesive herein should be between 0.36 and 0.68 kg./ream, depending on the substrate and the amount of moisture present. For industrial laminations such as bonding foams for insulation, the coating weight of the adhesive will be substantially higher.

After the reactive hot-melt adhesive is coated on the substrate, bonding is accomplished by placing a second substrate over the coated surface at elevated temperatures and applying pressure for 2 or 3 seconds. If the second substrate applied is at room temperature, the pressure can usually be removed within one second, as the temperature at the bond will be rapidly reduced below 60° C. Alternatively, the lamination can be passed through a nip roll at temperatures of, e.g., 80°–85° C. The lamination is then allowed to cool below 60° C. When the bonded, multi-layered substrate is cured in the presence of moisture for, e.g., 20 hours at 40° C., and at 90% relative humidity, the full final adhesive strength is achieved.

The flexible substrates which can be laminated using the reactive hot-melt adhesive are such materials as synthetic polymers, e.g., nylon; plastics; treated polyolefins such as low-density polyethylene or oriented polypropylene films; polyvinylidene chloride-coated films such as PVDC-coated ethylene glycol dimethyl terephthalate (Mylar is the trademark), polyether and polyester urethane foams; aluminum foil; paper; metals; asbestos; and other flexible substrates which can be laminated by conventional adhesives. It is to be noted that certain substrates which have surfaces which are inherently difficult to adhere, such as polyolefins, must be electrostatically treated (by corona discharge) before being coated with the reactive hot-melt adhesive to be suitable for the process herein. Typical applications would include lamination of films used in snack packages, vacuum pouches, unit packages, etc., and industrial laminations for the manufacture of insulating materials.

When an adhesive other than a hot melt is prepared in accordance with the present invention, it may be utilized in any laminating application suited to the adhesive, so that non-flexible substrates may also be bonded in accordance with this invention, such as acrylonitrile-butadiene-styrene sheets, vinyl sheets, and metal to glass.

The following examples will illustrate the embodiments of the invention herein. In the examples, all parts and percentages are given by weight and all temperatures in degrees Celsius unless otherwise noted.

VISCOSITY TEST

Viscosities are measured using a Brookfield viscometer by observing the reading on the scale of the instrument when a suitable rotating spindle is immersed in the sample. For measurement of viscosities at elevated temperatures the Thermosel (trademark) adaptation of the Brookfield procedure is employed, which uses an electrically heated cell and a sample container of closely controlled dimensions. All viscosities herein are expressed in centipoise.

BOND STRENGTH TEST

A film of suitable weight of the adhesive sample is deposited onto one of the two substrates to be laminated, either on a laminating machine or at a bench using an appropriate applicator. A second substrate is then pressed onto the coated side of the first substrate, and the resulting construction is passed through a set of nip rolls maintained at a suitable temperature and pressure. Samples approximately 20.3 cm. long and 2.5 cm. wide are cut from the construction. Each sample is then peeled apart at an angle of 180 degrees, using a commercial testing apparatus designed for this purpose, at a designated time interval. Initial bond strength indicates testing within five minutes to an hour after the exit of the lamination from the nip rolls, and typically within 30 minutes. The force required to peel the substrates apart is expressed herein in g./cm.

EXAMPLE I

A stream of dry nitrogen gas was led into the vessel and maintained throughout the reaction. The given amount of the indicated alcohol was then added with stirring, and the reaction mixture was heated to the given reaction temperature and reacted for the given period of time.

The carbamate esters designated as I-O in Table I were prepared as above except that the alcohol was initially charged into the reaction vessel, and methylene bis-phenyl diisocyanate (for carbamate esters I and J) or toluene diisocyanate (for esters K-O) was added slowly thereto in the given total amount over a period of 0.5 to 1.25 hours at a temperature of 100° C.

The carbamate esters designated as P-R were prepared as described for A-H except that phenyl isocyanate was employed instead of methylene bis-phenyl isocyanate, and for esters Q and R the reaction was run as an 80% solution in xylene. The time for addition of the alcohol in each case was two hours.

For esters S and T, the same procedure was followed as for P-R except that isophorone diisocyanate was used as the isocyanate.

The physical properties of each carbamate ester are summarized in Table I.

TABLE I

| Carbamate Ester | Total Amount of Disocyanate Added (g.) | Type of Alcohol | Amount of Alcohol Added (g.) | Reaction Temp. (°C.) | Reaction Time (hrs.) | Properties of Product Melting Point (°C.) | Viscosity RT$^a$ (cps.) |
|---|---|---|---|---|---|---|---|
| A | 250.0 | 2-ethyl hexanol | 260.5 | 100 | 4.0 | — | 360,000 |
| B | 250.0 | 1-octanol | 260.5 | 120 | 4.0 | 116 | — |
| C | 500.0 | isobutanol | 296.3 | 130 | 4.25 | 130-8 | — |
| D | 250.0 | mixed C$_{12}$, C$_{13}$ alcohols | 388.0 | 120 | 4.25 | 102.7 | — |
| E | 328.4 | 2-methyl-1-butanol | 194.8 | 100 | 4.00 | 70-3 | — |
| F | 271.8 | 2-methyl-1-pentanol | 191.7 | 100 | 4.0 | 49-52 | — |
| G | 250.0 | 2-butoxy ethanol | 236.4 | 100 | 4.0 | 78 | — |
| H | 125.0 | butoxydiethylene glycol | 162.2 | 100 | 4.0 | — | 32,000 |
| I | 250.0 | cyclohexanol | 260.5 | 100 | 4.0 | 75-8 | — |
| J | 250.0 | 2-methyoxy ethanol | 152.2 | 96 | 4.0 | 93 | — |
| K | 274.2 | 2-methyoxy ethanol | 152.2 | 110 | 7.0 | — | 312,000 |
| L | 174.2 | methoxydiethylene glycol | 210.3 | 100 | 6.0 | — | 96,000 |
| M | 174.2 | n-butanol | 148.2 | 100 | 6.5 | 73-5 | — |
| N | 174.2 | isobutanol | 148.2 | 94 | 6.5 | 113-5 | — |
| O | 174.2 | n-butanol/n-propanol (45:55) | 134.2 | 104 | 4.5 | 47-55 | — |
| P | 119.1* | 2-ethyl hexanol | 130.2 | 96 | 6.7 | — | 140 |
| Q | 119.1* | neopentyl glycol | 52.1 | 80 | 6.6 | 143-45 | — |
| R | 119.1* | trimethylol propane | 44.7 | 90 | 7.0 | 145 | — |
| S | 222.3 | 2-ethyl hexanol/dibutylamine (50:50) | 259.2 | 100 | 5.7 | — | 1.74 million |
| T | 222.3 | isobutanol | 148.2 | 98 | 5.7 | — | 8 million |

$^a$RT = room temperature
*Monocyonate Employed

This example illustrates the preparation of carbamate esters used in preparing the modified polyurethane compositions herein.

The carbamate esters designated as A-H in Table I were prepared as follows:

The given amount of methylene bis-phenyl diisocyanate was charged into a reaction vessel equipped with thermometer, gas inlet tube, stirrer and addition funnel.

EXAMPLE II

This example illustrates the preparation of various isocyanate-terminated prepolymers for use in preparing the modified polyurethane compositions herein.

The prepolymers designated as AA-FF in Table II were prepared by reacting methylene bis-phenyl diisocyanate in the given amount with the given amount of polyol in the presence of a chain extender, if indicated, in a moisture-free atmosphere for four hours at 100° C. If a chain extender was employed, additional time was allowed for the reaction. The prepolymers were thereafter evaluated for viscosity and percent isocyanate groups.

EXAMPLE III

This example illustrates the preparation of various modified polyurethane compositions herein and compares their performance with compositions modified with typical plasticizers.

The compositions designated as 1–48 in Table III were prepared by thoroughly mixing the indicated amount of one of the prepolymers AA–FF with either a carbamate ester A–T or with a plasticizer (as a control) in the amount given. Mixing was continued until the modifier was completely dissolved in the prepolymer. The viscosity at 100° C. and at room temperature for each resultant composition as compared with that of the prepolymer alone was evaluated as described above and is summarized in Table III. In addition, Compositions 1–5 were evaluated for initial bond strength on Mylar and low-density polyethylene as substrates, and the results are indicated in Table III. The data show that the carbamate ester lowers the cold viscosity of the prepolymer to a lesser extent as compared with the plasticizer, and in several instances actually increases the cold viscosity thereof. It is also seen that a wide variety of carbamate esters is suitable for this purpose.

TABLE II

| Prepolymer | Amount of Diisocyanate (g.) | Type of Polyol | Molecular Weight(s) of Polyol | Amount(s) of Polyol (g.) | Chain Extender | Amount of Chain Extender (g.) | Percent Isocyanate in Preduct (%) |
|---|---|---|---|---|---|---|---|
| AA | 670.5 | Polypropylene glycol mixture | 750/450 | 750.0/311.0 | — | — | 4.5 |
| BB | 900.0 | Polypropylene glycol mixture | " | 311.0/804.6 | — | — | 3.9 |
| CC | 554.0 | Polypropylene glycol mixture | " | 750.0/311.0 | — | — | 2.46 |
| DD | 297.9 | Neopentyl glycol 1,6-hexane diol adipate | 3000 | 2100.0 | — | — | 1.7 |
| EE | 134.2 | Neopentyl glycol 1,6-hexane diol adipate | " | 699.2 | Ethylene glycol | 4.1 | 2.3 |
| FF | 402.6 | Neopentyl glycol 1,6-hexane diol adipate | " | 2097.6 | Aminomethyl propanol | 25.9 | 1.96 |

TABLE III

| Modified Composition | Prepolymer Type | Prepolymer Amount (g.) | Modifier Type | Modifier Amount (g.) | Percent of Prepolymer | Prepolymer Viscosity @100° C. (cps.) | Prepolymer Viscosity @R.T. (cps., MM)[b] | Modified Composition @100° C. (cps.) | Modified Composition @R.T. (cps., MM)[b] | Initial Bond Strength (g./cm) |
|---|---|---|---|---|---|---|---|---|---|---|
| 1[a] | BB | 169.9 | Diisooctyl adipate | 31.9 | 18.8 | 3000 | 5.5 | 300 | 0.2 | 80–100 |
| 2 | BB | 171.7 | Carbamate M | 32.3 | 18.8 | " | " | 800 | 7.3 | 160 |
| 3 | BB | 132.6 | Carbamate N | 24.9 | 18.8 | " | " | 980 | >8 | 190–200 |
| 4[a] | AA | 105.7 | Diisooctyl adipate | 19.9 | 18.8 | 2200 | 5.4 | 440 | 0.1 | 40–60 |
| 5 | AA | 105.7 | Carbamate E | 19.9 | 11.0 | " | " | 880 | 2.6 | 160 |
| 6 | AA | 105.7 | Carbamate F | 19.9 | 11.0 | " | " | 960 | 1.7 | |
| 7[a] | AA | 105.7 | Diisooctyl adipate | 31.7 | 30.0 | " | " | 240 | 0.03 | |
| 8 | AA | 105.7 | Carbamate E | 31.7 | 30.0 | " | " | 980 | 1.6 | |
| 9 | AA | 105.7 | Carbamate F | 31.7 | 30.0 | " | " | 850 | 1.2 | |
| 10 | AA | 100.0 | Carbamate I | 18.8 | 18.8 | " | " | 4400 | 8.0 | |
| 11[a] | AA | 105.7 | Diissooctyl adipate | 42.8 | 40.0 | " | " | 210 | 0.02 | |
| 12 | AA | 105.7 | Carbamate E | 42.8 | 40.0 | " | " | 980 | 1.3 | |
| 13 | AA | 105.7 | Carbamate F | 42.8 | 40.0 | " | " | 840 | 1.0 | |
| 14[a] | AA'[c] | 97.2 | 2-Ethylhexyl diphenyl phosphate | 19.4 | 20.0 | 2950 | 2.7 | 420 | 0.2 | |
| 15[a] | AA' | 88.0 | Butyl benzyl phthalate | 17.6 | 20.0 | " | " | 360 | 0.3 | |
| 16[a] | AA'[c] | 100.9 | 1:1 Dipropylene glycol benzoate to Diethylene glycol benzoate | 20.2 | 20.0 | 2,950 | 2.7 | 520 | 0.8 | |
| 17[a] | AA' | 100.4 | Diisooctyl adipate | 20.1 | 20.0 | " | " | 240 | 0.2 | |
| 18 | AA' | 102.0 | Carbamate N | 2.6 | 2.5 | " | " | 1,300 | 2.9 | |
| 19 | AA' | 92.4 | Carbamate N | 4.6 | 5.0 | " | " | 1,000 | 2.8 | |
| 20 | AA' | 95.4 | Carbamate N | 19.1 | 20.0 | " | " | 880 | 6.4 | |
| 21 | AA' | 84.1 | Carbamate N | 42.1 | 50.0 | " | " | 520 | >8 | |
| 22 | AA' | 67.2 | Carbamate N | 67.2 | 100.0 | " | " | 760 | >8 | |
| 23 | AA' | 91.3 | Carbamate G | 18.3 | 20.0 | " | " | 1,000 | 2.9 | |
| 24 | AA' | 92.1 | Carbamate H | 18.4 | 20.0 | " | " | 760 | 1.6 | |

TABLE III-continued

| Modified Compo-sition | Prepolymer Type | Prepolymer Amount (g.) | Modifier Type | Modifier Amount (g.) | Percent of Prepolymer | Viscosity Prepolymer @100° C. (cps.) | Viscosity Prepolymer @R.T. (cps., MM)[b] | Viscosity Modified Composition @100° C. (cps.) | Viscosity Modified Composition @R.T. (cps., MM)[b] | Initial Bond Strength (g./cm) |
|---|---|---|---|---|---|---|---|---|---|---|
| 25 | AA' | 98.0 | Carbamate P | 19.6 | 20.0 | " | " | 500 | 0.6 | |
| 26 | AA' | 85.6 | Carbamate Q | 17.1 | 20.0 | " | " | 670 | 0.5 | |
| 27 | AA' | 93.2 | Carbamate R | 18.6 | 20.0 | " | " | 700 | 3.2 | |
| 28 | AA' | 88.1 | Carbamate S | 17.6 | 20.0 | " | " | 1,040 | 2.9 | |
| 29 | AA' | 90.8 | Carbamate T | 18.2 | 20.0 | " | " | 820 | 3.1 | |
| 30[a] | CC | 169.9 | Diisooctyl adipate | 31.9 | 18.8 | 60,000 | 8.0 | 1,800 | 1.8 | |
| 31 | CC | 174.2 | Carbamate J | 32.7 | 18.8 | " | " | 20,700 | >8 | |
| 32 | CC | 149.6 | Carbamate L | 28.1 | 18.8 | " | " | 12,000 | >8 | |
| 33 | CC | 154.0 | Carbamate M | 29.0 | 18.8 | " | " | 13,000 | 2.3 | |
| 34 | CC | 163.4 | Carbamate N | 30.7 | 18.8 | " | " | 20,000 | >8 | |
| 35 | CC | 154.1 | Carbamate O | 29.8 | 18.8 | " | " | 15,000 | >8 | |
| 36 | CC'[c] | 192.4 | Carbamate D | 36.2 | 18.8 | 72,000 | >8 | 9,800 | >8 | |
| 37[a] | DD | 192.6 | Diisooctyl adipate | 38.7 | 18.8 | 45,000 | 1.4 | 4,500 | 0.04 | |
| 38 | DD | 201.6 | Carbamate A | 37.9 | 18.8 | " | " | 5,200 | 2 | |
| 39 | DD | 202.6 | Carbamate B | 38.1 | 18.8 | " | " | 6,000 | Solid | |
| 40[a] | EE | 163.1 | Neopentyl glycol di-benzoate | 30.7 | 18.8 | 15,000 | 0.8 | 3,300 | 0.8 | |
| 41[a] | EE | 154.3 | p-Toluene sulfonamide | 29.0 | 18.8 | " | " | 12,000 | 1.3 | |
| 42 | EE | 149.0 | Carbamate A | 28.0 | 18.8 | " | " | 5,000 | 6.2 | |
| 43 | FF | 141.0 | Carbamate C | 26.5 | 18.8 | 31,000 | 3.2 | 13,000 | 6.9 | |
| 44 | FF | 157.8 | Carbamate A | 29.7 | 18.8 | " | " | 19,000 | 5.4 | |
| 45 | FF | 152.4 | Carbamate J | 28.7 | 18.8 | " | " | 29,500 | >8 | |
| 46 | FF | 149.6 | Carbamate K | 28.1 | 18.8 | " | " | 22,500 | 4.9 | |
| 47 | FF | 157.4 | Carbamate M | 26.9 | 18.8 | " | " | 15,000 | 3.8 | |
| 48 | FF | 135.9 | Carbamate N | 25.5 | 18.8 | " | " | 14,000 | 5.3 | |

[a]These examples are included for comparative purposes.
[b]MM means million.
[c]The prime symbol indicates a second batch of the designated prepolymer, having a different viscosity.

EXAMPLE IV

This example illustrates the preparation and performance of a modified polyurethane composition as a solvent-borne adhesive containing the prepolymer.

The compositions designated as 49–51 in Table IV were prepared by the method outlined in Example III using prepolymer AA except that ethyl acetate was added as solvent to the compositions during mixing thereof. The viscosities of the resulting compositions, having 80% solids, as well as the initial bond strengths,

EXAMPLE V

This example illustrates the effect of concentration of carbamate ester on the performance of the polyurethane composition.

A urethane prepolymer having 4.6% residual isocyanate groups was prepared as described in Example II using 804.6 parts methylene-bisphenyl diisocyanate, 900.0 parts polypropylene glycol of molecular weight 750, and 373.2 parts polypropylene glycol of molecular weight 450.

TABLE IV

| Modified Composition | Amt. of Prepolymer (g.) | Type of Modifier | Amt. of Modifier (g.) | Amt. of Modifier (%[a]) | Amt. of Solvent (g.) | Properties of Modified Composition Viscosity at R.T. (cps.) | Properties of Modified Composition Initial Bond Strength (g./cm.) |
|---|---|---|---|---|---|---|---|
| 49[b] | 147.9 | — | — | — | 37.0 | 2100 | —[c] |
| 50[b] | 105.7 | Diisooctyl adipate | 19.9 | 18.8 | 31.4 | 960 | 20–60 |
| 51 | 105.7 | Carbamate E | 19.9 | 18.8 | 31.4 | 1500 | 160–200 |

[a]By weight, based on prepolymer.
[b]These examples are included only for comparative purposes.
[c]Not determined.

are indicated in Table IV. The results show that both the plasticizer and the carbamate ester lower the viscosity of the prepolymer. However, in order for a composition to be obtained having a solution viscosity comparable with that of the carbamate-modified composition at the same solids level, an amount of plasticizer must be added to the prepolymer which detracts from the performance of the composition in terms of bond strength, or alternatively, the molecular weight (viscosity) of the prepolymer must be increased to such an extent that a comparable solution viscosity is no longer obtained.

A carbamate ester was prepared by the preparation procedure for esters A–H in Example I using 1203.1 parts toluene diisocyanate, 906.1 parts isobutanol and 60.2 parts methanol, wherein each alcohol was slowly added to the diisocyanate, and the excess methanol was later distilled from the reaction mixture. The resulting ester had a melting point of 113°–115° C.

Six compositions designated 52–57 in Table V were prepared by mixing the indicated proportion of carbamate ester with the prepolymer prepared above. To each formulation was added enough ethyl acetate to form a 25% solution. The viscosity at 100° C. and at room temperature for each solution was determined as described above. Each solution was used to laminate 50 M Mylar to low-density polyethylene film. Application of the solutions on the substrates was accomplished using a #12 wire-wound bar which is designed to deposit a coating of approximately 0.5 kg. per ream from a 25% solution. The coatings thus applied were force-dried with a heat-gun, and the two substrates were bonded by passing the construction through a nip roll set at 88° C. and 18 psi. The initial bond strength and the bond strength of each formulation at the indicated time intervals were measured and are indicated in Table V.

TABLE V

| Modified Composition | Parts Carbamate Ester per 100 Parts Urethane Prepolymer | Viscosity @100° C. (cps.) | Viscosity @R.T. (cps.,MM) | Bond Strength (g./cm.) Initial | 15 min. (@66° C.) | 24 hr. | 72 hr. | 1 wk. | Static Load |
|---|---|---|---|---|---|---|---|---|---|
| 52[a] | 0 | 3100 | 2.3 | 98–118 | 118–137 | 216 | 670 | 550 | No Failure |
| 53 | 20 | 1000 | 2.8 | 157 | 177 | 256 | 630 | 690 | No Failure |
| 54 | 35 | 800 | 5.5 | 157 | 197 | 256–275 | 708 | 630 | No Failure |
| 55 | 50 | 800 | >8.0 | 177–197 | 197 | 275 | 708 | 630 | 0.2 in. (0.5 cm) |
| 56 | 75 | 520 | >8.0 | 197–216 | 216 | 256–275 | 750 | 550 | 100% Failure |
| 57 | 100 | 400 | >8.0 | 197–216 | 216 | 236 | 550 | 866 | 100% Failure |

[a]This example is included only for comparative purposes.

The results show that increasing the carbamate ester levels decreases the hot viscosity of the polyurethane composition, while increasing the viscosity at room temperature. In addition, the initial and subsequent bond strengths of the modified compositions are, in general, better than that of the control (unmodified prepolymer).

The static load of each formulation was determined by casting a film thereof on both sides of a stainless-steel plate such that the film adheres to one square inch (6.5 square cm.) of area on each side of the plate. The plate is then held vertically, a weight is suspended therefrom, and the entire assembly is put in an oven at 82° C. The static load is a measure of the heat resistance and is determined by measuring the distance over which the adhesive film slips down the plate. No failure indicates that the film does not move at all, while 100% failure indicates that the film falls off during the test or moves a full inch. The data, summarized in Table V, indicate that the good heat resistance of the control as measured by static load is not impaired by amounts of up to 35% carbamate ester. It is noted, however, that only one carbamate ester is illustrated here, and that with other esters, greater or lesser amounts of ester may be tolerated for good heat resistance.

EXAMPLE VI

This example illustrates the use of the modified compositions herein for adhering various flexible substrates.

The modified composition 53 of Example V was applied to one of the substrates in Table VI from a 25% solution as described in Example V, and the substrates were laminated. Each construction was then tested for bond strength at the indicated time intervals. The results are given in Table VI.

TABLE VI

| Substrates | Bond Strengths (g./cm.) Initial | 15 min. (@66° C.) | 24 hr. | 72 hr. | 1 wk. |
|---|---|---|---|---|---|
| P10 Mylar/LDPE[a] | 118–138 | 157 | 276 | 472 | 748–787 |
| Nylon/LDPE | 118–128 | 138–157 | 394 | 670 | 630–670 |
| K Cello/LDPE | 138 | 148 | 157 | 315 | 394 |
| Foil/LDPE | 138–148 | 157 | 315–335 | 630 | 512–550 |

[a]LDPE = low-density polyethylene

EXAMPLE VII

This example illustrates simultaneously (a) the preparation of a carbamate ester in situ and (b) the formation of the polyurethane prepolymer in the presence of the carbamate ester.

A reaction vessel equipped with a thermometer, stirrer, condenser, addition funnel and gas inlet tube was purged with dry nitrogen gas, and 40.1 g. of 2-ethyl hexanol and 105.6 g. of methylene bis-phenyl diisocyanate were then added thereto. The amount of methylene bis-phenyl diisocyanate is the sum of the amount required for preparation of the carbamate ester, methyl bis-(2-ethylhexyl)phenyl carbamate, and the amount required for the subsequent prepolymer synthesis. The reaction mixture was heated to 100° C. and allowed to react at that temperature for two hours, after which time the following ingredients were added in the given amounts:

| | |
|---|---|
| 1,6-hexane diol/neopentyl glycol adipate, 3000MW | 349.6 g. |
| water (chain extender) | 0.9 g. |
| Modaflow (Trademark of Monsanto Chemical Co.) | 0.25 g. |

The reaction mixture was thereafter heated an additional three hours at 100° C. and poured hot from the vessel. The product had the following properties:

| | |
|---|---|
| Percent solids | 100% |
| Percent isocyanate groups | 0.8% |
| Viscosity at 110° C. | 10,000 cps. |
| Viscosity at room temp. | 2,400,000 cps. |

A film of the product was clear and tacky, and cured overnight to a tough, rubbery polymer.

EXAMPLE VIII

This example illustrates the use of carbamate esters to modify fully reacted polyurethanes.

Compositions 58–72 in Table VII were prepared by adding 20% by weight based on solids of the indicated carbamate ester of the invention or plasticizer (as a control) to the given commercial fully reacted polyurethane resin. Films with a wet thickness of 8 mils from solutions containing 15–20% by weight of these formulations were examined for the compatibility of the modifier in the resin and for general physical properties. The results are indicated in Table VII. It can be seen that the carbamate esters show good compatibility with the polyurethanes, while the dioctyl adipate plasticizer shows poor compatibility with the polyurethanes designated by the trademarks Q-Thane PA 10 and Estane 5710. Furthermore, the plasticizers tend to exude from the film as an oily exudate, which gives an undesirable feel to a polyurethane when used as a coating, whereas the carbamate esters show no exudation. In addition, the carbamate esters show ability to improve the clarity of the fully reacted polyurethanes by either making them clear or making them less cloudy (hazy).

In summary, the present invention is seen to provide a polyurethane adhesive having improved viscosity characteristics, good performance at room temperature, and high bond strength.

Now that the preferred embodiments of the present invention have been described in detail, various modifications and improvements thereon will become readily apparent to those skilled in the art. Accordingly the spirit and scope of the invention are to be limited only by the appended claims, and not by the foregoing specification.

fully reacted polyurethane and at least an effective amount of a monomeric carbamate ester which contains at least one linkage of the formula

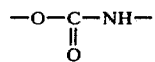

and which is compatible and not reactive with said prepolymer or fully reacted polyurethane.

2. The adhesive composition of claim 1 wherein the isocyanate-terminated prepolymer is employed.

3. The adhesive composition of claim 1 wherein the fully reacted polyurethane is employed.

4. The adhesive composition of claim 1 also containing solvent.

5. The adhesive composition of claim 1 wherein said carbamate ester is a solid at room temperature, and is employed in an amount of 2 to 50% by weight, based on said prepolymer or fully reacted polyurethane.

6. The adhesive composition of claim 1 wherein said carbamate ester is present in an amount of 2.0 to 110% by weight, based on said prepolymer or fully reacted polyurethane, this amount being dependent on the ester and the prepolymer or polyurethane.

7. The adhesive composition of claim 1 wherein said carbamate ester is prepared from an isocyanate selected from the group consisting of methylene bis-phenyl diisocyanate, phenyl isocyanate, isophorone diisocyanate and toluene diisocyanate.

8. A process for laminating substrates wherein the composition of claim 1 is employed as the adhesive.

9. A process for laminating flexible substrates wherein the composition of claim 2 is employed as a solventless adhesive.

TABLE VII

| Modified Composition | Polyurethane | Modifier | Compatibility of Modifier | Exudation of Modifier | Appearance of Composition |
|---|---|---|---|---|---|
| 58[a] | Q-Thane PA 10[b] | — | — | — | very slightly cloudy |
| 59[a] | " | Dioctyl adipate | poor | yes | slightly cloudy |
| 60 | " | Carbamate N | good | no | slightly cloudy |
| 61 | " | Carbamate H | good | no | very hazy |
| 62 | " | Carbamate T | good | no | very hazy |
| 63[a] | Q-Thane PA 78[b] | — | — | — | cloudy |
| 64[a] | " | Dioctyl adipate | good | no | cloudy |
| 65[a] | " | Dibutyl phthalate | good | no | cloudy |
| 66 | " | Carbamate A | good | no | clear |
| 67 | " | Carbamate J | good | no | hazy |
| 68[a] | Estane 5710[c] | — | — | — | clear |
| 69[a] | " | Dioctyl adipate | poor | yes | clear |
| 70 | " | Carbamate A | good | no | clear |
| 71 | " | Carbamate T | good | no | clear |
| 72 | " | Carbamate J | good | no | clear |

[a]These examples are included for comparative purposes.
[b]Trademarks for polyurethanes prepared from polyester diols and aromatic diisocyanates.
[c]Trademark for a diphenyl methane diisocyanate-1,4-butane diol adipate-1,4-butane diol polyurethane available from Goodrich Chemical Corp.

What is claimed is:

1. A modified polyurethane adhesive composition comprising an isocyanate-terminated prepolymer or a 10. A laminated film assembly bonded by the adhesive composition of claim 1.